United States Patent
Liao et al.

(10) Patent No.: US 8,173,019 B2
(45) Date of Patent: May 8, 2012

(54) METHOD FOR FORMING FACULTATIVE-ORGANISM-ADAPTED MEMBRANE BIOREACTOR

(75) Inventors: Zhimin Liao, Shenzhen (CN); Jianzhong Xiong, Shenzhen (CN); Shengyun Yang, Shenzhen (CN); Jialin Zhou, Shenzhen (CN); Xingfu Jiang, Shenzhen (CN); Lingyun He, Shenzhen (CN); Qihu He, Shenzhen (CN); Dejin Ju, Shenzhen (CN); Aiguo Wan, Shenzhen (CN); Zhihua Yuan, Shenzhen (CN); Jiejun Cao, Shenzhen (CN); Kun Tao, Shenzhen (CN)

(73) Assignee: Jiangxi JDL Environmental Protection Research Ltd., Nanchang (CN)

( * ) Notice: Subject to any disclaimer, the term of this patent is extended or adjusted under 35 U.S.C. 154(b) by 307 days.

(21) Appl. No.: 12/552,512

(22) Filed: Sep. 2, 2009

(65) Prior Publication Data

US 2010/0288697 A1 Nov. 18, 2010

(30) Foreign Application Priority Data

May 15, 2009 (CN) .......................... 2009 1 0115352

(51) Int. Cl.
*C02F 3/00* (2006.01)
(52) U.S. Cl. ....................................... 210/620; 210/629
(58) Field of Classification Search ........... 210/620–629
See application file for complete search history.

(56) References Cited

U.S. PATENT DOCUMENTS 6,616,843 B1 * 9/2003 Behmann et al. ............. 210/605

* cited by examiner

*Primary Examiner* — Chester Barry
(74) *Attorney, Agent, or Firm* — Matthias Scholl P.C.; Matthias Scholl

(57) ABSTRACT

A method for forming a facultative-organism-adapted membrane bioreactor by: providing a membrane bioreactor having a membrane module, aerating intensively the membrane module at a lower part thereof and maintaining the scouring against the membrane module so that an aerobic environment is formed at a middle and lower part of the membrane module, and controlling aeration intensity so that a facultative or anaerobic environment is formed around the membrane module excluding the middle and lower part thereof. The a facultative-organism-adapted membrane bioreactorformed by the method has low energy consumption, low sludge yield coefficient, and high efficiency of nitrogen and phosphorus removal.

16 Claims, No Drawings

METHOD FOR FORMING FACULTATIVE-ORGANISM-ADAPTED MEMBRANE BIOREACTOR

CROSS-REFERENCE TO RELATED APPLICATIONS

Pursuant to 35 U.S.C. §119 and the Paris Convention Treaty, this application claims the benefit of Chinese Patent Application No. 200910115352.0 filed May 15, 2009, the contents of which are incorporated herein by reference.

BACKGROUND OF THE INVENTION

1. Field of the Invention

The invention relates to a method for forming a membrane bioreactor, and more particularly to a method for forming a facultative-organism-adapted membrane bioreactor with facultative microbe as predominant microbe.

2. Description of the Related Art

A membrane bioreactor (MBR) is the combination of a membrane separation technology and a bio-reaction technology, and is widely used for treatment of municipal and industrial wastewaters. Membrane bioreactors exist in various forms such as submerged membrane bioreactor, separated membrane bioreactor and so on. By membrane bioreactor, the separation effect of solid and liquid in a system has been improved, and thereby the effluent quality and volume loading of a treatment system have been enhanced greatly.

However, nowadays widely-used membrane bioreactors are pure aerobic membrane bioreactors. These pure aerobic membrane bioreactors have many disadvantages. Firstly, to maintain a good scouring effect against the membrane and ensure sufficient oxygen for aerobic microbe to degrade pollutants, a high-powered blower is needed to provide oxygen for the membrane bioreactor, thereby resulting in high energy consumption. Secondly, in a pure aerobic membrane bioreactor aerobic microbe is predominant, although the aerobic microbe has a faster degradation rate on the sludge, its reproductive cycle is much shorter than that of facultative or anaerobic microbe, and thereby sludge yield in an aerobic membrane bioreactor is much more than that in a facultative or anaerobic membrane bioreactor, resulting in high sludge yield coefficient and difficulty to remove the sludge. Thirdly, under aerobic conditions, microbe can only convert ammoniacal nitrogen of wastewater into nitrate nitrogen and absorb phosphor, but cannot release phosphor; the further removal of nitrogen and release of phosphor need to be conducted in facultative or anaerobic conditions, which cannot be achieved in a pure aerobic membrane bioreactor and results in a bad efficiency of nitrogen and phosphorus removal.

SUMMARY OF THE INVENTION

In view of the above-described problems, it is one objective of the invention to provide a method for forming a facultative-organism-adapted membrane bioreactor with facultative microbe as predominant microbe and characterized by low energy consumption and high efficiency of nitrogen and phosphorus removal.

To achieve the above objectives, in accordance with one embodiment of the invention, there is provided a method for forming a facultative-organism-adapted membrane bioreactor with facultative microbe as predominant microbe and characterized by low energy consumption and high efficiency of nitrogen and phosphorus removal, the method comprising providing a membrane bioreactor comprising a membrane module, aerating intensively the membrane module at a lower part thereof and maintaining the scouring against the membrane module so that an aerobic environment is formed at a middle and lower part of the membrane module, and controlling aeration intensity so that a facultative or anaerobic environment is formed around the membrane module excluding the middle and lower part thereof.

In a class of this embodiment, the aeration is conducted in a manner of a blower in combination with a perforated pipe or in a manner of jet aeration. The aeration intensity focuses on the lower part of the membrane module to form a local aerobic environment and to maintain the scouring effect against the membrane module so that microbe can degrade organic compounds quickly by aerobic nitrification and phosphor absorption under aerobic conditions.

In a class of this embodiment, a concentration of dissolved oxygen in the aerobic environment is 2-4 mg/L, and a concentration of dissolved oxygen around the membrane module excluding the middle and lower part thereof is less than 1.0 mg/L so as to maintain a facultative environment.

In a class of this embodiment, facultative microbe is predominant and has a percent of more than 60%, and coexists with aerobic microbe in the facultative membrane bioreactor.

Advantages of the invention are summarized below: in the facultative membrane bioreactor of the invention, the aerobic environment and anaerobic environment are formed alternately, so aerobic nitrification and phosphor absorption under aerobic environment and denitrification and phosphor release under anaerobic environment can be conducted smoothly, and thereby problems such as high sludge yield and low efficiency of nitrogen and phosphor removal are solved. Compared with a pure aerobic membrane bioreactor, in the invention, the total nitrogen removal rate is more than 70%, and the total phosphor removal rate is more than 60%. Furthermore, due to facultative microbe as predominant microbe in the invention, the total biochemical oxygen demand is reduced, the energy consumption is merely 0.25-0.5 Kw·h/$m^3$, the total sludge concentration is 15000-25000 mg/L, and the effluent quality is stable and better than the GB/T18920-2002 standard of the reuse of urban recycling water-urban miscellaneous water consumption.

DETAILED DESCRIPTION OF THE EMBODIMENTS

The embodiment provides a method for forming a facultative-organism-adapted membrane bioreactor with facultative microbe as predominant microbe and characterized by low energy consumption and high efficiency of nitrogen and phosphorus removal, comprising providing a membrane bioreactor comprising a membrane module, aerating intensively the membrane module at a lower part thereof and maintaining the scouring effect against the membrane module so that an aerobic environment is formed at a middle and lower part of the membrane module, and controlling aeration intensity so that a facultative or anaerobic environment is formed around the membrane module excluding the middle and lower part thereof.

In this embodiment, the concentration of dissolved oxygen in the aerobic environment is 2-4 mg/L, thereby providing a biochemical reaction condition for rapid degradation of organic compounds, aerobic nitrification, and aerobic phosphor absorption.

In this embodiment, the concentration of dissolved oxygen around the membrane module excluding the middle and lower part thereof is less than 1.0 mg/L so as to maintain a facultative environment.

In this embodiment, facultative microbe has a percent of 70%, aerobic microbe has a percent of 10%, and other microbe has a percent of 20%.

Therefore, by controlling the concentration of dissolved oxygen in most areas of the membrane bioreactor at less than 1.0 mg/L, the facultative microbe is predominant and coexists with the aerobic microbe.

In the membrane bioreactor of this embodiment, the aerobic environment and anaerobic environment are formed alternately, so aerobic nitrification and phosphor absorption under aerobic environment and denitrification and phosphor release under anaerobic environment can be conducted smoothly. In this embodiment, the total nitrogen removal rate is more than 70%, the total phosphor removal rate is more than 60%, and the energy consumption is merely 0.25-0.5 Kw·h/m$^3$, which is decreased by 50% of energy consumption compared with conventional aerobic membrane bioreactor.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for forming a facultative-organism-adapted membrane bioreactor, the method comprising
   a) providing a membrane bioreactor comprising a membrane module, wherein aerobic microbe and facultative microbe coexist in the membrane bioreactor and the facultative microbe existing in the membrane bioreactor is predominant;
   b) aerating intensively said membrane module at a lower part thereof and maintaining a scouring effect against said membrane module so that an aerobic environment is formed at a middle and lower part of said membrane module; and
   c) controlling aeration intensity so that a concentration of dissolved oxygen around said membrane module excluding the middle and lower part thereof is less than 1.0 mg/L whereby a facultative or anaerobic environment is formed around said membrane module excluding the middle and lower part thereof.

2. The method of claim 1, wherein the aeration intensity is controlled whereby a concentration of dissolved oxygen in said aerobic environment is 2-4 mg/L.

3. The method of claim 2, wherein said facultative microbe is predominant and has a percent of more than 60%.

4. The method of claim 1, wherein said aerating is conducted in a manner of a blower in combination with a perforated pipe.

5. The method of claim 1, wherein said aerating is conducted in a manner of jet aeration.

6. The method of claim 1, the facultative microbe comprises more than 60% of the microbes in the membrane bioreactor.

7. The method of claim 1, the facultative microbe comprises 70% of all the microbes in the membrane bioreactor, and the aerobic microbe comprises 10% of all the microbes in the membrane bioreactor.

8. A method for forming a facultative-organism-adapted membrane bioreactor, the method comprising
   a) providing a membrane bioreactor comprising a membrane module, wherein aerobic microbe and facultative microbe coexist in the membrane bioreactor and the facultative microbe existing in the membrane bioreactor is predominant;
   b) aerating intensively said membrane module at a lower part thereof and maintaining a scouring effect against said membrane module so that an aerobic environment is formed at a middle and lower part of said membrane module; and
   c) controlling aeration intensity so that a concentration of dissolved oxygen at the middle and lower part of said membrane module is 2-4 mg/L, whereby providing a concentration of dissolved oxygen around said membrane module excluding the middle and lower part thereof of less than 1.0 mg/L to form a facultative or anaerobic environment around said membrane module excluding the middle and lower part thereof.

9. The method of claim 8, the facultative microbe comprises more than 60% of all the microbes in the membrane bioreactor.

10. The method of claim 8, the facultative microbe comprises 70% of all the microbes in the membrane bioreactor, and the aerobic microbe comprises 10% of all the microbes in the membrane bioreactor.

11. The method of claim 8, wherein said aerating is conducted using a blower in combination with a perforated pipe.

12. The method of claim 8, wherein said aerating is conducted in by jet aeration.

13. A method for forming a facultative-organism-adapted membrane bioreactor, the method comprising
   a) providing a membrane bioreactor comprising a membrane module, wherein aerobic microbe and facultative microbe coexist in the membrane bioreactor and the facultative microbe existing in the membrane bioreactor is predominant;
   b) aerating intensively said membrane module at a lower part thereof and maintaining a scouring effect against said membrane module so that an aerobic environment is formed at a middle and lower part of said membrane module; and
   c) controlling aeration intensity so that a concentration of dissolved oxygen at the middle and lower part of said membrane module is 2-4 mg/L, whereby providing a concentration of dissolved oxygen around said membrane module excluding the middle and lower part thereof of less than 1.0 mg/L to form a facultative or anaerobic environment around said membrane module excluding the middle and lower part thereof;
   wherein the facultative microbe comprises more than 60% of all the microbes in the membrane bioreactor.

14. The method of claim 13, the facultative microbe comprises 70% of all the microbes in the membrane bioreactor, and the aerobic microbe comprises 10% of all the microbes in the membrane bioreactor.

15. The method of claim 13, wherein said aerating is conducted using a blower in combination with a perforated pipe.

16. The method of claim 13, wherein said aerating is conducted by jet aeration.

* * * * *